United States Patent [19]

Nedo et al.

[11] Patent Number: 5,505,653

[45] Date of Patent: Apr. 9, 1996

[54] ABRASIVE/WATER JET CUTTING APPARATUS

[75] Inventors: Werner Nedo, Bautzen; Harry Thonig, Neukirch; Mathias Walden, Sohland, all of Germany

[73] Assignee: Saechsische Werkzeug und Sondermaschinen GmbH, Germany

[21] Appl. No.: 136,962

[22] Filed: Oct. 14, 1993

[30] Foreign Application Priority Data

Oct. 17, 1992 [DE] Germany .......................... 42 35 091.3

[51] Int. Cl.⁶ .............................. B24B 49/00; B24C 3/02
[52] U.S. Cl. .................. 451/5; 451/11; 451/24; 451/99; 451/100; 451/102
[58] Field of Search .................... 451/5, 8, 9, 10, 451/11, 24, 26, 38, 39, 40, 75, 80, 82, 84, 87, 88, 89, 91, 99, 100, 101, 102; 83/177

[56] References Cited

U.S. PATENT DOCUMENTS

| | | |
|---|---|---|
| 532,374 | 1/1995 | Hermes . |
| 2,732,040 | 1/1956 | De Vost et al. . |
| 2,985,050 | 5/1961 | Schwacha . |
| 3,212,378 | 10/1965 | Rice . |
| 3,637,051 | 1/1972 | Paine et al. . |
| 3,694,972 | 10/1972 | Emeis ........................... 451/75 |
| 3,730,040 | 5/1973 | Chadwick et al. . |
| 3,877,334 | 4/1975 | Gerber . |
| 3,978,748 | 9/1976 | Leslie et al. . |
| 4,112,797 | 9/1978 | Pearl . |
| 4,137,804 | 2/1979 | Gerber et al. . |
| 4,463,639 | 8/1984 | Gerber . |
| 4,501,182 | 2/1985 | Jardat et al. . |
| 4,651,476 | 3/1987 | Marx et al. . |
| 4,669,229 | 6/1987 | Ehlbeck . |
| 4,723,387 | 2/1988 | Krasnoff ..................... 451/75 |
| 4,728,379 | 3/1988 | Audi et al. . |
| 4,862,649 | 9/1989 | Davis et al. ................. 451/75 |
| 4,864,780 | 9/1989 | Ehlbeck et al. . |
| 4,872,293 | 10/1989 | Yasukawa et al. . |
| 4,872,975 | 10/1989 | Benson . |
| 4,934,111 | 6/1990 | Hashish et al. ............. 451/75 |
| 4,934,112 | 6/1990 | Jackson ....................... 451/75 |
| 4,964,244 | 10/1990 | Ehlbeck . |
| 5,018,317 | 5/1991 | Koyoshige et al. ........ 451/75 |
| 5,065,551 | 11/1991 | Fruser ......................... 451/75 |
| 5,083,487 | 1/1992 | Croteau . |
| 5,127,199 | 7/1992 | Blankers et al. . |
| 5,155,946 | 10/1992 | Domann ..................... 451/75 |

FOREIGN PATENT DOCUMENTS

| | | |
|---|---|---|
| 2411069 | 7/1979 | France . |
| 1216799 | 8/1989 | Japan . |

OTHER PUBLICATIONS

Technische Rundschau, vol. 81, Oct. 20, 1989, p. 32 "Schnells Wasser Als Flexibles Werkzeug" Ing. Ernst Nyffenegger.

Primary Examiner—Maurina T. Rachuba
Attorney, Agent, or Firm—Pepe & Hazard

[57] ABSTRACT

An abrasive/water jet cutting apparatus has a frame, a carriage movably supported for movement over a work table on the frame, and a water jet cutting head on the carriage. A main storage container for abrasive is provided and an intermediate storage container for abrasive is supported on the carriage. A connecting arm has a pivotal connection at its one end to the frame and a pivotal connection at its other end to the carriage. The arm also has a pivotal connection intermediate its length so that it pivots about the pivotal connections during movement of the carriage. A suction line from the main storage container extends along the connecting arm to the intermediate storage container to supply abrasive thereto, and a high pressure line extending from a high pressure fluid source extends along the connecting arm to the cutting head. The high pressure line is resiliently deflectable at the pivotal connections about which it extends, and the vacuum line is resiliently deflectable. A conduit extends between the intermediate storage container and said cutting head.

14 Claims, 2 Drawing Sheets

ABRASIVE/WATER JET CUTTING APPARATUS

BACKGROUND OF THE INVENTION

The present invention relates to water jet cutting machines and, more particularly, to such machines providing for separate delivery of a fluid under high pressure and an abrasive for mixing in the movable cutting head of a water jet cutting system.

Cutting of soft, elastic, heat sensitive materials as well as cutting of hard and brittle materials by use of a water jet containing an abrasive is a known process. Generally, the abrasive is mixed with the water jet within the cutting head and is delivered from a container which is moved with the cutting head. This container is capable of storing the required amount of abrasive for cutting of individual workpieces, and, usually, after each workpiece is cut, this storage container must be refilled or exchanged. Because the required supply of abrasives has to be moved in the storage container with the cutting head, the duration of the cutting process is limited, and the cutting speed is relatively slow due to the mass which has to be accelerated and moved.

The cutting fluid is put under very high pressure by means of a high pressure pump next to the cutting machine and is delivered through a high pressure line to the cutting head. Usually, the cutting head is guided on a movable carrier or on a robot arm. To accomplish this, an elbow-type high pressure tubing, which is freely supported, is generally used to connect the movable cutting head to the stationary pressure or pump amplifier through pipe-swivel fittings. It is also known to connect the high pressure tube through spiral-wound tube pieces which are located on the pressure amplifier and on the cutting head.

Based on this, German Patentschrift 3631116 describes the use of a spiral-wound tube between a gantry and the machine frame. From the end of the gantry, the high pressure tube is connected, and movable in a wide curve to the cutting head. Typically, high pressure lines are not protected and, therefore, are considerably endangered especially in situations where machines are loaded by cranes.

Accordingly, it is an object of the present invention to provide a novel water jet cutting machine in which a high pressure line and an abrasive feed line are carried from stationary sources to the cutting head by means of a pivoting connecting arm.

It is also an object to provide such a machine in which the supply of abrasive in a container at the cutting head is replenished automatically.

Another object is to provide such a machine which is relatively long lived and able to operate for relatively extended periods.

SUMMARY OF THE INVENTION

It has now been found that the foregoing and related objects may be readily attained in a water jet cutting apparatus having a frame, a work table, a carriage supported for movement over the work table, and a water jet cutting head on the carriage. The apparatus includes a main storage container for abrasives and an intermediate storage container for abrasive on the carriage. A connecting arm has a pivotal connection at one end to the frame adjacent the main storage container and a pivotal connection at its other end to the carriage, and the arm has a pivotal connection intermediate its length. The arm is free to pivot about the several pivotal connections during movement of the carriage.

A feed line extends from the main storage container along the connecting arm to the intermediate storage container to supply abrasive thereto, and the suction line is resiliently deflectable about the pivotal connections about which it passes. A high pressure line extends from the fluid reservoir along the connecting arm to the cutting head, and it is resiliently deflectable at the pivotal connections about which it passes. A conduit extends between the intermediate storage container and the cutting head.

In the preferred embodiment, the high pressure line has resiliently deflectable spiral wound sections at the pivotal connections of the arm about which it extends.

A suction pump is provided on the carriage to draw abrasive from the main storage container, and this may be effected by its control of the operation of the vacuum pump in the carriage. Desirably, a meter device is provided in the conduit from the intermediate storage container to the cutting head, and the spiral wound section at the connection between the high pressure line and cutting head is removable.

DETAILED DESCRIPTION OF THE ILLUSTRATED EMBODIMENTS

Figure 1:
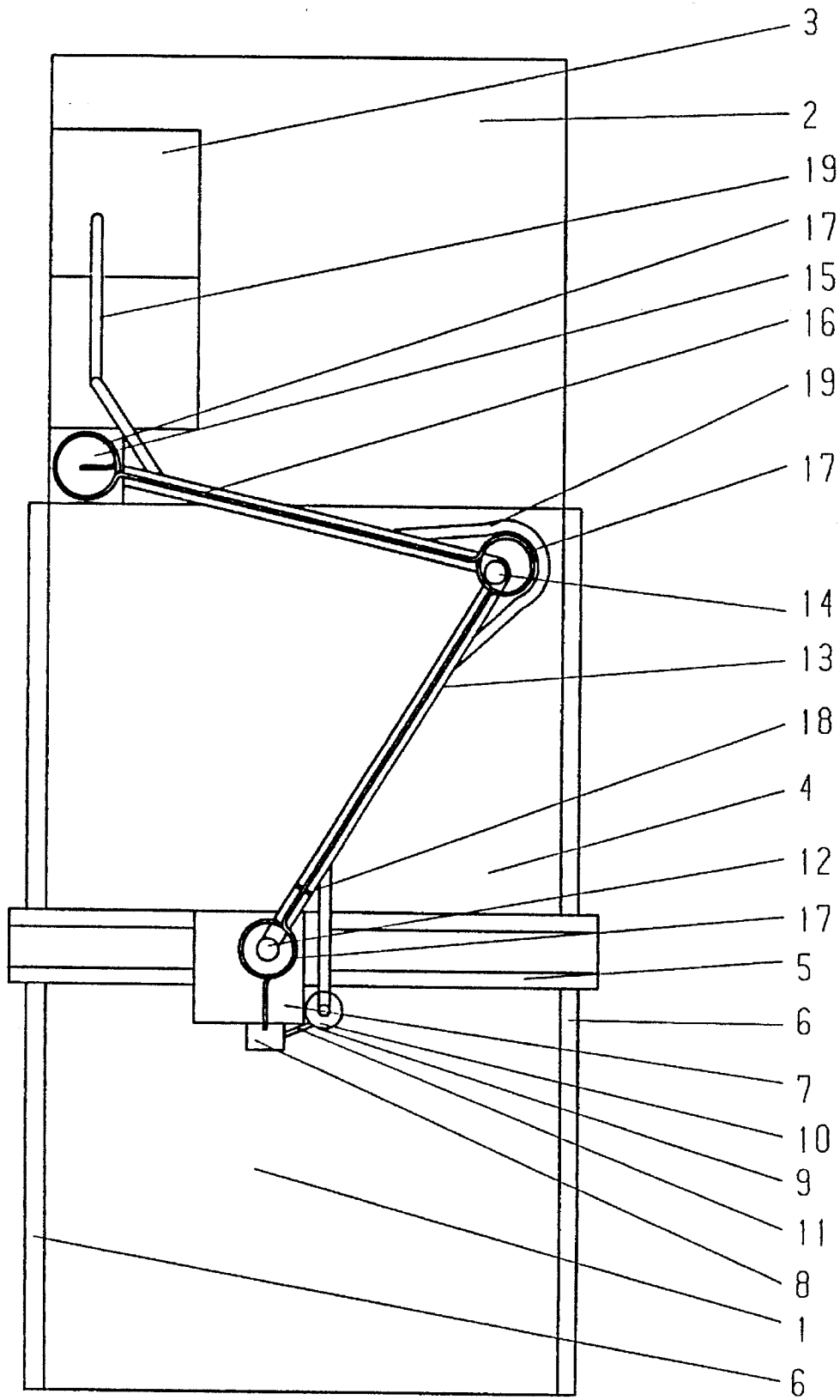
FIG. 1 is a schematic illustration of the principal operating components of a water jet cutting machine embodying the present invention.
Figure 2:
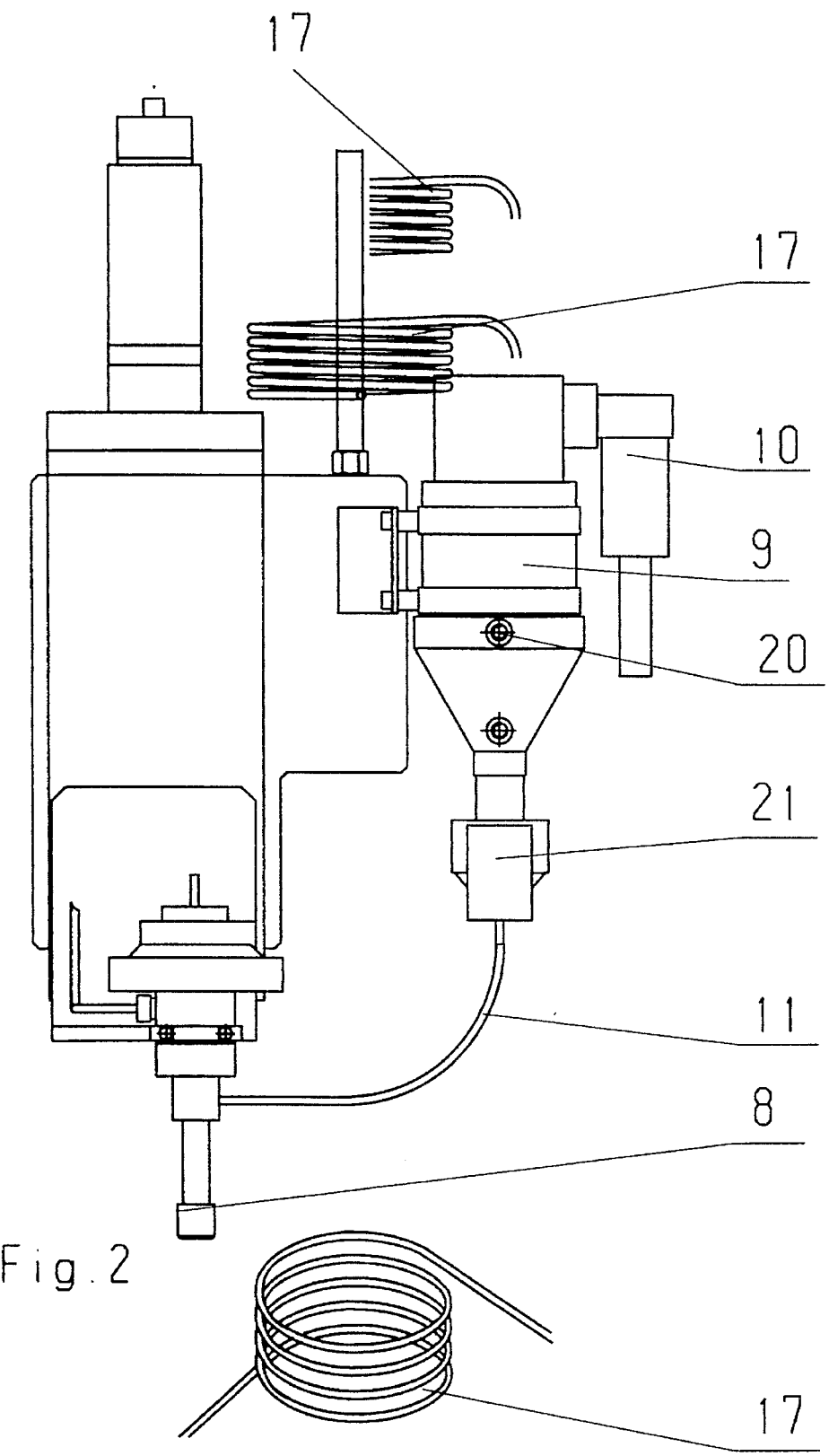
FIG. 2 is a partially diagrammatic illustration of the components at the cutting head.
Figure 3:
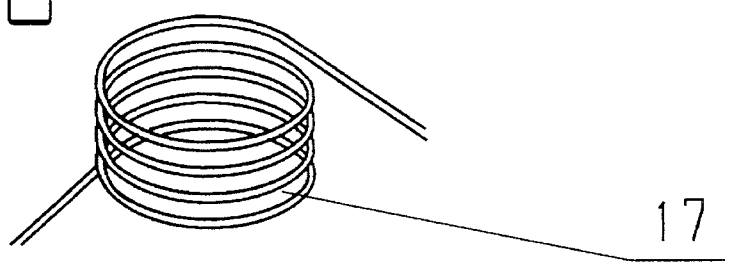
FIG. 3 is an illustration of a spiral wound tube section.

As seen in the attached drawing, a water jet cutting machine embodying the present invention is generally designated by the numeral 1 and includes a supply unit 2 which contains the storage container 3 for abrasives, and supports a work table 4. Above the work table 4 is a traversing unit or bridge 5 which runs on rails 5 which extend along the sides of the work table 4. The bridge 5 in turn has a carriage 7 movable along its length, upon which is mounted a cutting head 8 which can be adjusted as to its height above the work table 4. Next to the cutting head 8 is an intermediate storage container 9 and a suction pump 10. The intermediate container 9 is connected to the cutting head 8 through a conduit or hose 11.

A two-part connecting arm 13 is mounted on one end to the carriage 7 by means of a pivotal connection 12. The connecting arm 13 has a pivotal connection between its two parts, and it is secured at its other end to the supply unit 2 by means of a pivotal connection 15.

On the connecting arm 13 is a high pressure line 16 with spiral wound tube sections 17 above the pivotal connections 12, 14 and 15. On the carriage 7, and on the connecting arm 13, is a slot guide 18 in which the high pressure line 16 runs, but it is removable from the connecting arm 13. The intermediate container 9 is connected to the storage container 3 through a flexible suction line 19 which runs inside the connecting arm 13 and around the pivotal connection 14.

When the carriage 7 and bridge 5 are moved by the drive system (not shown), the connecting arm 13 above the work table 4 is also being moved. Due to the spiral-wound tube sections 7, movement of the pivotal connections 12, 14 and 15 through an angle of 120° is possible so that pressurized water can continuously be supplied to the cutting head 8. The suction pump 10 creates a vacuum in the suction line 19 and sucks abrasive from the storage container 3 into the intermediate container 9. The operation of the suction pump 10 is regulated by a fill level sensor diagrammatically illustrated by the numeral 20. An abrasive feed regulator in the conduit 11 is diagrammatically indicated by the numeral 21.

The feed line for the abrasive is conveniently provided by resiliently deflectable synthetic resin tubing and desirably the synthetic resin is one which provides good wear characteristics.

The high pressure fluid line is desirably fabricated from austenitic steel, at least for the spiral wound tube sections to provide the desired resiliently deflectability at each of the pivotal connections of the two-part arm. As can be seen, the spiral wound section at the cutting head also accommodates the vertical motion of the cutting head relative to the carriage upon which it is mounted. Desirably, the section at the head is readily removable to permit servicing of the head.

Thus, it can be seen from the attached drawings and the foregoing detailed specification that the water jet cutting machine of the present invention continuously supplies abrasive from a large storage container to an intermediate storage container on the cutting head. This enables longer and faster operation, and both the high pressure fluid line and the abrasive feed line are protected and carried by the two-part arm so that the potential for damage thereto is effectively reduced. The result is a long lived and highly effective water jet cutting machine.

Having thus described the invention, what is claimed is:

1. In an abrasive/water jet cutting apparatus, the combination comprising:
   (a) a frame;
   (b) a work table on said frame;
   (c) a carriage supported for movement over said work table;
   (d) drive means for moving said carriage over said work table;
   (e) a water jet cutting head on said carriage;
   (f) a main storage container for abrasive;
   (g) an intermediate storage container for abrasive on said carriage;
   (h) a connecting arm extending over said work table and having a pivotal connection at one end to said frame and a pivotal connection at its other end to said carriage, said arm having a pivotal connection intermediate its length, said arm pivoting about said pivotal connections during movement of said carriage;
   (i) a feed line from said main storage container extending along said connecting arm to said intermediate storage container to supply abrasive thereto, said feed line resiliently deflecting at said pivotal connections about; which it extends;
   (j) a high pressure line extending from a high pressure fluid supply along said connecting arm to said cutting head, said high pressure line being resiliently deflectable at said pivotal connections about which it extends; and
   (k) a conduit between said intermediate storage container and said cutting head to emit a high pressure abrasive/fluid jet from said cutting head.

2. The abrasive/water jet cutting apparatus in accordance with claim 1 wherein said high pressure line has resiliently deflectable spiral wound sections at said pivotal connections of said arm about which it extends.

3. The water jet cutting apparatus in accordance with claim 1 wherein there is included a suction pump on said carriage to draw abrasive from said main storage container to said intermediate storage container.

4. The water jet cutting apparatus in accordance with claim 1 wherein there is included a metering device in the conduit from said intermediate storage container to said cutting head.

5. The water jet cutting apparatus in accordance with claim 1 wherein said intermediate storage container has a sensor for the level of the contents thereof to control the feed of abrasive through said feed line from said main storage container.

6. The water let cutting apparatus in accordance with claim 1 wherein there is included a suction pump on said carriage to draw abrasive from said main storage container to said intermediate storage container and said sensor operates said vacuum pump.

7. The water jet cutting apparatus in accordance with claim 2 wherein said spiral wound section between said high pressure line and said cutting head is removable.

8. The abrasive/water jet cutting apparatus in accordance with claim 2 wherein at least said spiral wound sections of said high pressure line are fabricated from an austenitic steel.

9. The abrasive/water jet cutting apparatus in accordance with claim 1 wherein there is included a bridge member extending over said work table and movable along the length thereof, said carriage being mounted on said bridge member for movement along its length, and wherein said drive means moves said carriage and said bridge member.

10. In an abrasive/water jet cutting apparatus, the combination comprising:
    (a) a frame;
    (b) a work table on said frame;
    (c) a bridge member extending over said work table and movable along the length thereof;
    (d) a carriage movably supported on said bridge member;
    (e) a water jet cutting head on said carriage;
    (f) a main storage container for abrasive;
    (g) an intermediate storage container for abrasive on said carriage;
    (h) a connecting arm extending over said work table and having a pivotal connection at one end to said frame and a pivotal connection at its other end to said carriage, said arm having a pivotal connection intermediate its length, said arm pivoting about said pivotal connections during movement of said carriage;
    (i) a feed line from said main storage container extending along said connecting arm to said intermediate storage container to supply abrasive thereto, said feed line resiliently deflecting at said pivotal connections about which it extends;
    (j) a high pressure line extending from a high pressure fluid supply extending along said connecting arm to said cutting head, said high pressure line having resiliently deflectable spiral wound sections at said pivotal connections about which it extends; and
    (k) a conduit between said intermediate storage container and said cutting head.

11. The abrasive/water jet cutting apparatus in accordance with claim 10 wherein there is included a suction pump on said carriage to draw abrasive from said main storage container to said intermediate storage container.

12. The abrasive/water jet cutting apparatus in accordance with claim 11 wherein there is included a level sensor for the level of the contents in said intermediate storage container to actuate said suction pump to control the feed of abrasive from said main storage container.

13. The abrasive/water jet cutting apparatus in accordance with claim 10 wherein there is included a metering device in the conduit from said intermediate storage container to said cutting head.

14. The abrasive/water jet cutting apparatus in accordance with claim 10 wherein said spiral wound section between said high pressure line and said cutting head is removable.

* * * * *

UNITED STATES PATENT AND TRADEMARK OFFICE
CERTIFICATE OF CORRECTION

PATENT NO. : 5,505,653
DATED : April 9, 1996
INVENTOR(S) : Werner Nedo et al

It is certified that error appears in the above-identified patent and that said Letters Patent is hereby corrected as shown below:

Column 4, line s 1, 5, 9, 14 and 19, before "water" insert --abrasive/--.

Column 4, line 14, delete "let" and insert --jet--.

Signed and Sealed this

Twenty-second Day of October, 1996

Attest:

BRUCE LEHMAN

Attesting Officer

Commissioner of Patents and Trademarks